US005953175A

United States Patent [19]
Oh

[11] Patent Number: 5,953,175
[45] Date of Patent: Sep. 14, 1999

[54] CONTROL APPARATUS OF A REAL TIME COUNTER FOR A VIDEO CASSETTE RECORDER

[75] Inventor: Young Gyu Oh, Seoul, Rep. of Korea

[73] Assignee: Goldstar Co., Ltd., Seoul, Rep. of Korea

[21] Appl. No.: 08/923,189

[22] Filed: Sep. 4, 1997

Related U.S. Application Data

[63] Continuation of application No. 08/364,804, Dec. 27, 1994, abandoned.

[30] Foreign Application Priority Data

Dec. 30, 1993 [KR] Rep. of Korea ............... 93-31631

[51] Int. Cl.$^6$ .................................................. G11B 27/22
[52] U.S. Cl. .................................. 360/69; 360/137
[58] Field of Search ............................. 360/69, 71, 137

[56] References Cited

U.S. PATENT DOCUMENTS

| | | |
|---|---|---|
| 4,210,943 | 7/1980 | Nakamura et al. ............... 360/70 |
| 4,288,731 | 9/1981 | Lee .................................. 360/78.04 X |
| 4,594,615 | 6/1986 | Nemoto ............................. 360/10.2 |
| 4,811,130 | 3/1989 | Takayama ........................ 360/73.11 |
| 4,827,361 | 5/1989 | Yoshioka .......................... 360/64 |
| 5,003,414 | 3/1991 | Yokozawa ........................ 360/77.15 |
| 5,008,764 | 4/1991 | Yoshida et al. .................. 360/77.15 |
| 5,193,003 | 3/1993 | Shimoi et al. ................... 360/31 |
| 5,396,378 | 3/1995 | Yokoyama ....................... 360/77.14 |
| 5,654,836 | 8/1997 | Oh . | |

*Primary Examiner*—Aristotelis M. Psitos
*Assistant Examiner*—James L. Habermehl
*Attorney, Agent, or Firm*—Oppenheimer Wolff & Donnelly LLP

[57] ABSTRACT

A control apparatus of a real time counter for a video cassette recorder. This apparatus comprises a CLOG detection section having an envelope detector, a comparator, and a low-pass filter for detecting a CLOG signal to judge whether a signal exists on the videotape; an ATF detection section having an ATF detector, an analog-to-digital converter, a band comparator, a shift register, and a state detector for detecting an automatic track following signal, an AND gate for performing a logical product between the CLOG signal and the automatic track following signal and an REC instruction; and a counting section having a switch which is for controlling a real time counter using the output, or a control signal of the AND gate. This apparatus accomplishes the accurate control of a counting by using an automatic track following signal as well as the CLOG signal.

7 Claims, 4 Drawing Sheets

FIG. 1 (PRIOR ART)
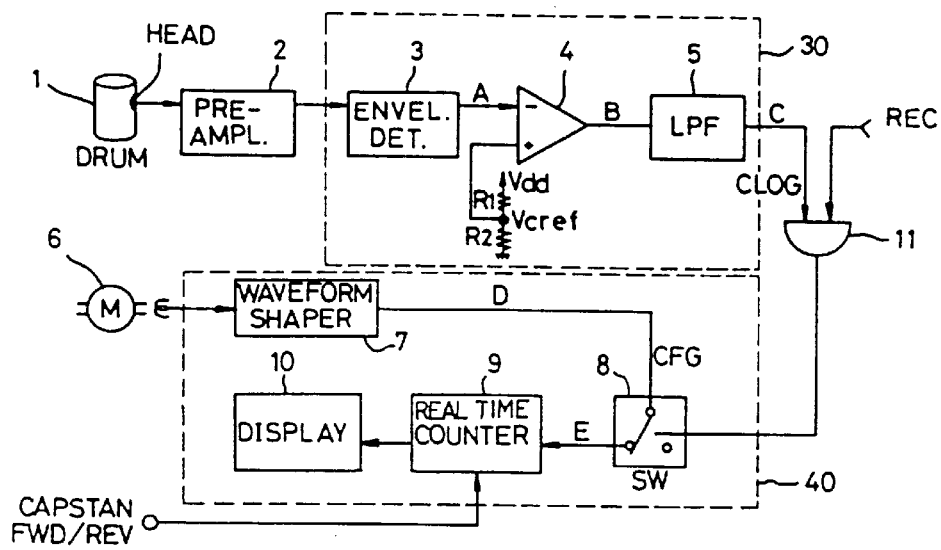
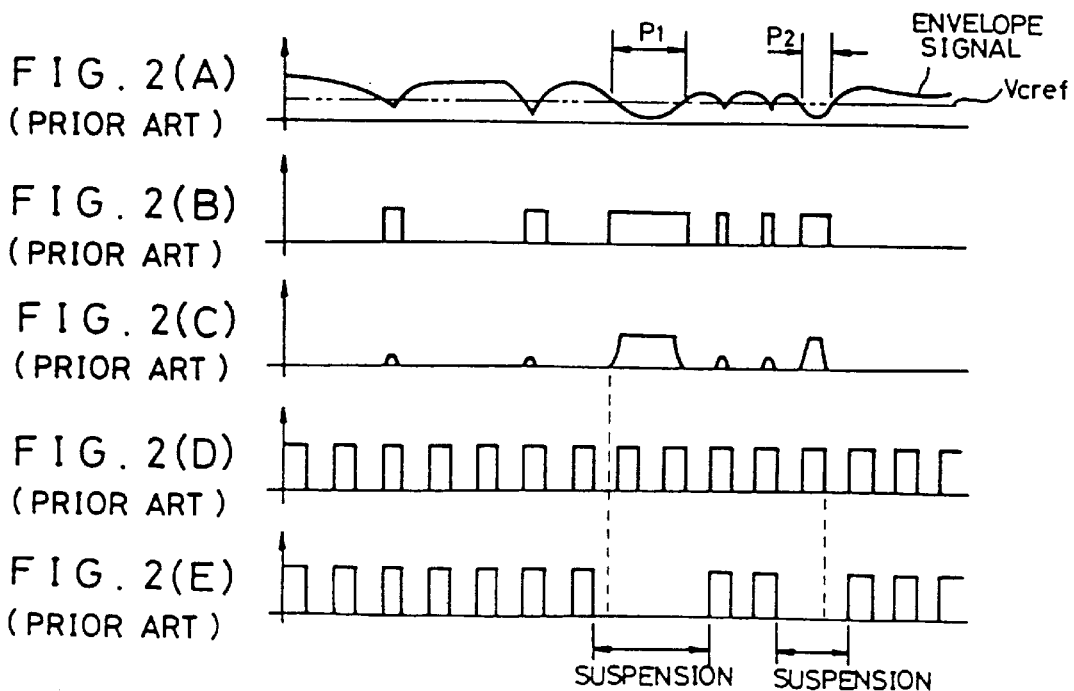
FIG. 2(A) (PRIOR ART)
FIG. 2(B) (PRIOR ART)
FIG. 2(C) (PRIOR ART)
FIG. 2(D) (PRIOR ART)
FIG. 2(E) (PRIOR ART)

CONTROL APPARATUS OF A REAL TIME COUNTER FOR A VIDEO CASSETTE RECORDER

This application is a continuation of U.S. patent application Ser. No. 08/364,804, filed Dec. 27, 1994, now abandoned.

BACKGROUND OF THE INVENTION

1. Field of the Invention

The present invention relates to a real time counter for a video cassette recorder (hereinafter referred to as "VCR"). More particularly the present invention relates to a control apparatus of a real time counter for a VCR which is capable of controlling precisely the operation of the real time counter which counts the degree of videotape travel, especially in the miniaturized 8-mm VCR format.

2. Description of the Prior Art

In the 8-mm VCR format, there are several methods for counting the degree of videotape travel: a method of real time counting, a method of counting the number of pulses from a take-up reel reflection plate, a method of measuring a remaining amount of videotape, etc.

Among them, the method of real time counting accomplishes a counting operation by detecting whether or not recorded signals exist on a videotape. It starts to count the degree of videotape travel by counting the recorded portion of the videotape from the zero point, i.e., the point where a "reset" signal is applied.

Alternatively, as a means for controlling a real time counter in a VHS type VCR, the operation of the real time counter is controlled by detecting a control signal which is marked earlier when recording an image.

On the other hand, in the 8-mm VCR format, instead of detecting the control signal, a video (RF signal Frequency) signal whose voltage level is detected when a head scans a videotape is used for judging whether recorded signals exist on the videotape. If the recorded signals exist, the operation of the real time counter is achieved by counting the number of the pulse signals generated by a frequency generator in a capstan motor. If there are no recorded signals, the operation of the real time counter is suspended.

FIG. 1 is a block diagram of a conventional control apparatus of a real time counter for a VCR. FIG. 2 shows waveforms appearing over the alphabetized parts (A–E) of the diagram in FIG. 1.

As shown in FIG. 1, a conventional control apparatus is composed of a CLOG detection section 30 for detecting a CLOG signal which is used for judging whether recorded signals from an RF signal amplified at a pre-amplifier 2 after reproduced by a head exist on the videotape; an AND gate 11 for performing a logical product between the CLOG signal and an REC signal which is used for choosing the mode of record or reproduction; a capstan motor 6 for allowing the videotape to travel; and a counting section 40 employing a real time counter 9 for counting the number of the pulse signals generated from a frequency generator in a capstan motor 6 of which the operation is controlled according to the output of the AND gate 11, and also employing a switch 8 for controlling the operation of the real time counter 9 according to the output of the AND gate 11.

In operation of the CLOG detection section 30, an RF signal which is reproduced by the head installed on the drum 1 is amplified at the pre-amplifier 2, and the envelope of the amplified signal is detected by the envelope detector 3 as a waveform (A) in FIG. 2. The envelope signal (the output of the envelope detector 3) is then compared at a comparator 4 with a reference voltage Vcref for judging whether a signal exists or not, and the compared output signal is shown as a waveform (B) in FIG. 2. As shown, if the level of the envelope signal, see the waveform (A) in FIG. 2, is higher than that of the reference voltage Vcref, the output of the comparator 4 goes 'low', while if the level of the envelope signal is lower than that of the reference voltage Vcref, the output of the comparator 4 goes 'high'. At this time, the voltage value of the reference voltage Vcref can be arbitrarily set by a formula, "$R_2/R_1+R_2$)," namely the voltage divider.

The output of the comparator 4 then passes through a low-pass filter 5 to make a waveform (C) depicted in FIG. 2. As shown, it is to be understood that the low-pass filter 5 suppresses a narrow-pulse-width signal, or a high-frequency component. The output of the low-pass filter 5 (the waveform (C) in FIG. 2) is provided as a CLOG signal to the following AND gate 11.

The AND gate 11 performs a logical product between a recording mode instruction, or an REC instruction and the output of the low-pass filter 5, or the CLOG signal. The REC instruction is set 'low' in a recording mode, and is set 'high' in the rest mode except during a record mode. The output of the AND gate 11 serves as a control signal for controlling the operation of the switch 8. If the control signal is low, the switch 8 is turned on, while if it is high, the switch 8 is turned off.

The real time counter 9 in the counting section 40 counts the extent of videotape travel by counting the number of CLOG signal pulses, see waveform (D) in FIG. 2, which is generated from the frequency generator in the capstan motor 6, and its form is shaped at a waveform shaper 7. The frequency of the CLOG signal is proportional to the revolutions of the capstan motor 6, and the CLOG signal is generated without interruption as long as the capstan motor 6 rotates.

The operation of the conventional control apparatus of the real time counter constructed above will be discussed both while in record mode and at rest.

In record mode, because the REC instruction has been set 'low', the output of the AND gate 11 goes 'low' regardless of the state of the CLOG signal. Therefore the switch 8 always stays turned on, and the real time counter 9 continues to perform a counting operation.

In the rest mode except during record mode, because the REC instruction has been set 'high', the output of the AND gate 11 depends upon the state of the CLOG signal. As is poorly the case, even though there exists, see the waveform (A) in FIG. 2, the envelope signal, because some portions of the envelope signal, as periods $P_1$, and $P_2$, are under the reference voltage Vcref, the CLOG signal is provided to the AND gate 11 in a high level, and thereby the output of the AND gate 11 goes 'high'. Thus, the switch 8 is turned off so that the counting operation of the real time counter is abnormally suspended, as a waveform (E) in FIG. 2, during the periods $P_1$ and $P_2$.

Meanwhile, the conventional control apparatus of a real time counter as shown in FIG. 1 is being adapted to the video camera and the VCR (model names are GS-$E_2$ and R-DDIP each) which are now commercially available from the applicant, Goldstar Co., Ltd. In addition, there is disclosed a prior U.S. Pat. No. 5,193,033 pertaining to the CLOG detection section 30 in FIG. 1.

FIG. 3 is a brief view showing video tracks on the videotape and the position of the head scanning the tracks.

In FIG. 3, $t_1$ stands for the width of the track, and $t_2$ for the width of the head. In the case that $t_1 > t_2$, a guard band the width of which is $t_1 - t_2$ is formed (it represents, in FIG. 3, narrow bands between the tracks which are not hatched). When the head normally scans the track as 'a' in FIG. 3, the output of the head (RF signal) is strong, while when the head abnormally scans the track as 'b' in FIG. 3, the RF signal corresponding to the track is weak.

Accordingly, in the case of 'b' in FIG. 3, when comparing the envelope signal detected at the envelope detector 3 with the reference voltage Vcref, if there appears a signal less than the level of the reference voltage Vcref (a signal appearing under the Vcref at the waveform (A) in FIG. 2), it has an effect on the counting operation. That is to say, even though there are some recorded signals on the videotape, the recorded signals are not read out due to the head's positional deviation. So, as a result, the real time counter suspends the counting operation.

Specifically, in a purely blank videotape, because the level of the envelope signal (waveform (A) in FIG. 2) should be lower than that of the reference voltage Vcref, Vcref must be necessarily established at a lower level. But, in effect, there is a technical limitation that the reference voltage Vcref cannot be set too low.

In practice, because of noise permeation, unless the reference voltage Vcref is set very low, the period that the counting operation is suspended appears as the periods $P_1$, and $P_2$ at the waveform (A) in FIG. 2, although a signal really exists. It follows then that counting accuracy is compromised. In other words, in the conventional art, since the counting operation depends only upon the CLOG signal, in the case that the head deviates from the video track as 'b' depicted in FIG. 3, the difficulty in accurately detecting the CLOG signal gives the real time counter an operational impediment.

SUMMARY OF THE INVENTION

The object of the present invention is to avoid such a problem as the conventional art has. To achieve this object, the present invention, a control apparatus of a real time counter for a VCR, accomplishes the accurate control of the counting operation by using an automatic track following (ATF) signal which is derived from the subtraction of frequencies of pilot signals detected from the RF signal, as well as the CLOG signal.

In one aspect of the present invention, there is provided CLOG detection means for detecting a CLOG signal, which is used for determining whether a signal exists or not, from an RF signal reproduced by a head on a drum;

ATF detection means for detecting an automatic track following signal, using the RF signal;

counting means for counting a pulse signal from a capstan motor;

display means for displaying a resulting value counted by said counting means; and control signal output means for providing a control signal for controlling the operation of said counting means according to the output signal of said CLOG detection means, the output signal of said ATF detection means, and a REC instruction.

BRIEF DESCRIPTION OF THE DRAWINGS

The above object and other advantages of the present invention will become clearer after a description of the preferred embodiment of the present invention with reference to the accompanying drawings, wherein:

FIG. 1 is a block diagram of a conventional control apparatus of a real time counter for a VCR;

FIGS. 2(A)–2(E) are views showing signal waveforms appearing over the designated parts (A to E) in FIG. 1;

DETAILED DESCRIPTION OF THE PREFERRED EMBODIMENT

In a 8-mm VCR format concerning the present invention, a phase control of a servo is accomplished by means of an ATF control. When recording, four pilot signals $f_1, f_2, f_3, F_4$ having s different frequencies are marked, from 100- to 200-kHz, on the videotape together with video signals, and during reproduction, the pilot signals are detected by a head. The detected pilot signals are then subtracted from one another, and the resulting signals ($f_1-f_2$, $f_2-f_3$, $f_3-f_4$, $f_4-f_1$) are provided as an ATF signal for the ATF control system to perform a phase control of a servo. Especially, since the pilot signals are lower-frequencied signals in comparison with a video RF signal, they are hardly affected by the azimuth of a video head, and a cross-talk between the adjacent tracks can be reduced. U.S. Pat. Nos. 4,594,615 and 4,210,943 disclose the ATF control system.

Figure 3:
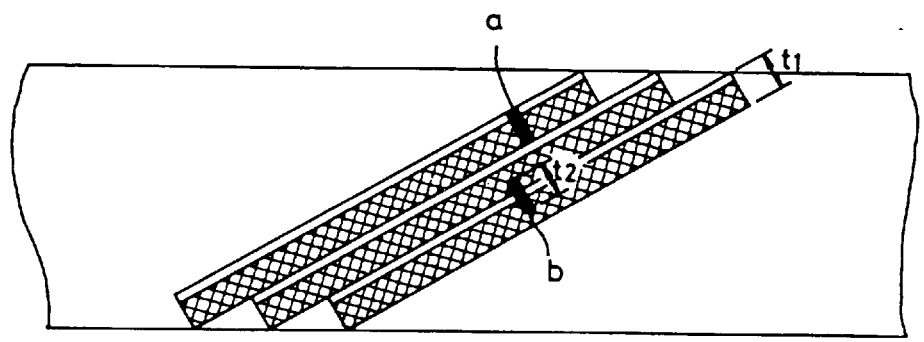
FIG. 3 is a view briefly showing the scanning position of a head.
Figure 4:
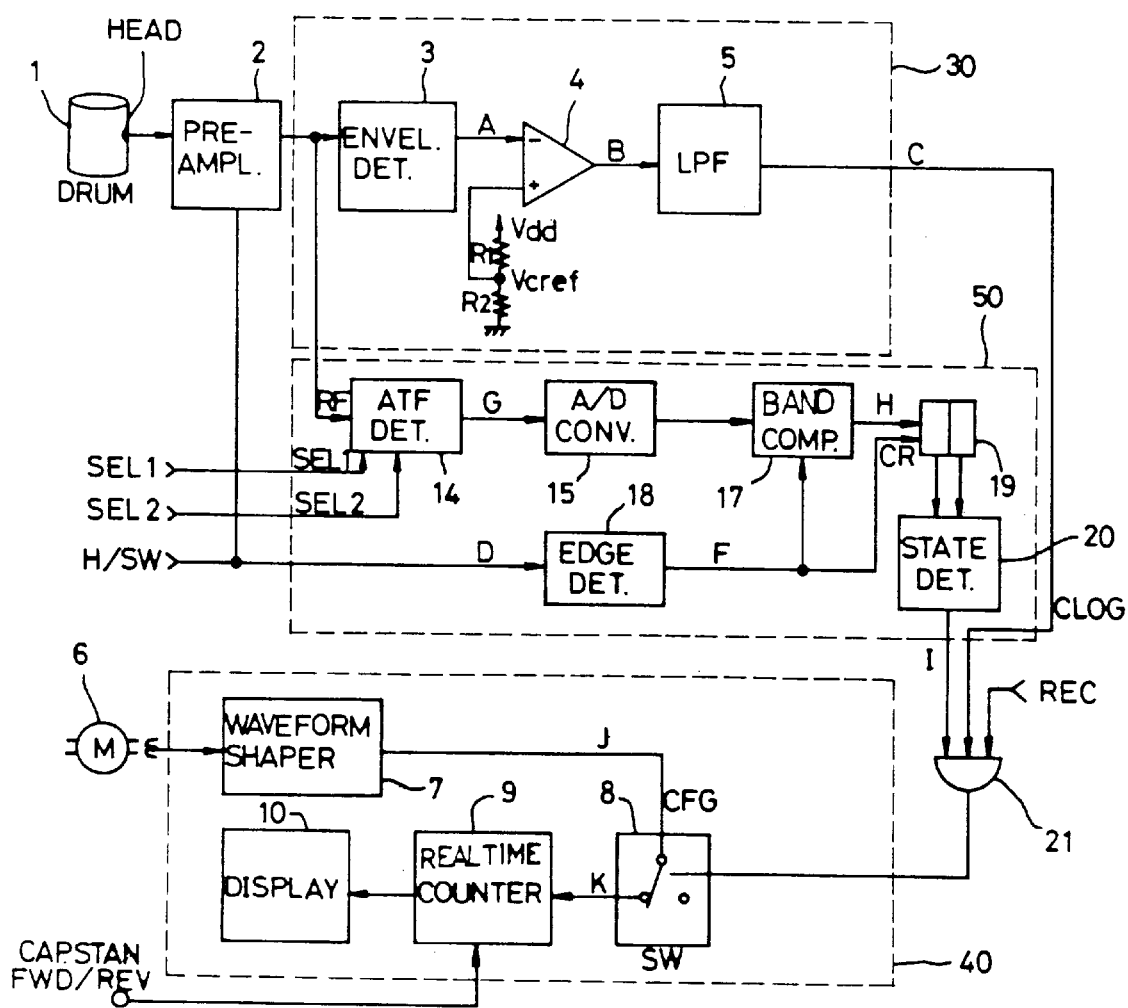
FIG. 4 is a block diagram of the present invention.

FIG. 4 shows a block construction of a control apparatus of a real time counter according to the present invention.

As shown, the present apparatus is generally composed of a CLOG detection section 30, a counting section 40, and an ATF detection section 50.

Moreover, the apparatus is composed of a head installed on a drum 1 for detecting an electrical RF signal from an image signal recorded on the videotape, a pre-amplifier 2 for amplifying the RF signal detected by the head, an AND gate 21 for performing a logical product between the output of the CLOG detection section 30 and the output of the ATF detection section 50 and a recording instruction, or an REC instruction, and for providing a control signal as a result of the logical product, and a capstan motor 6 for moving the videotape in a forward or reverse direction.

The CLOG detection section 30 similar to the conventional art depicted in FIG. 1 is composed of an envelope detector 3 for detecting an envelope from the RF signal amplified at the pre-amplifier 2, a comparator 4 for comparing the envelope detected by the envelope detector 3 with a reference voltage, and a low-pass filter 5 for suppressing a high-frequency component of the output of the comparator 4.

The counting section 40 similar to the conventional art depicted in FIG. 1 is composed of a waveform shaper 7 for shaping a sinusoidal waveform generated from a frequency generator in the capstan motor 6, the frequency of which is proportional to the revolutions of the capstan motor 6, into a rectangular waveform, a switch 8 for switching a signal generated from the waveform shaper 7 (CFG signal) by being controlled by the output of the AND gate 21, a real time counter 9 for counting the number of the pulse of the CFG signal from the waveform shaper 7, and a display 10 for displaying the count number.

The real time counter 9 performs either an up-count or a down-count in accordance with a capstan forward/reverse control signal. The CFG signal provided from the waveform shaper 7 enters the real time counter 9 under the switching control of the switch 8.

The operation of the present invention, a control apparatus of a real time counter for a VCR as constructed above will be discussed with reference to FIGS. 4 and 5. The operation of the CLOG detection section 30 and counting section 40 is the same as the conventional art depicted in FIG. 1, so a discussion of them will be omitted.

Referring to FIG. 4, the ATF detection section 50 employs an ATF detector 14 for detecting pilot signals $f_1, f_2, f_3, f_4$ from the RF signal amplified by the pre-amplifier 2. The ATF detector 14 selects, as a reference pilot signal, one out of four pilot signals $f_1, f_2, f_3, f_4$ by being given reference pilot signal selection instructions $SEL_1$ and $SEL_2$ from a servo controller (not shown), with reference to a waveform (E) in FIG. 5.

Figure 5:
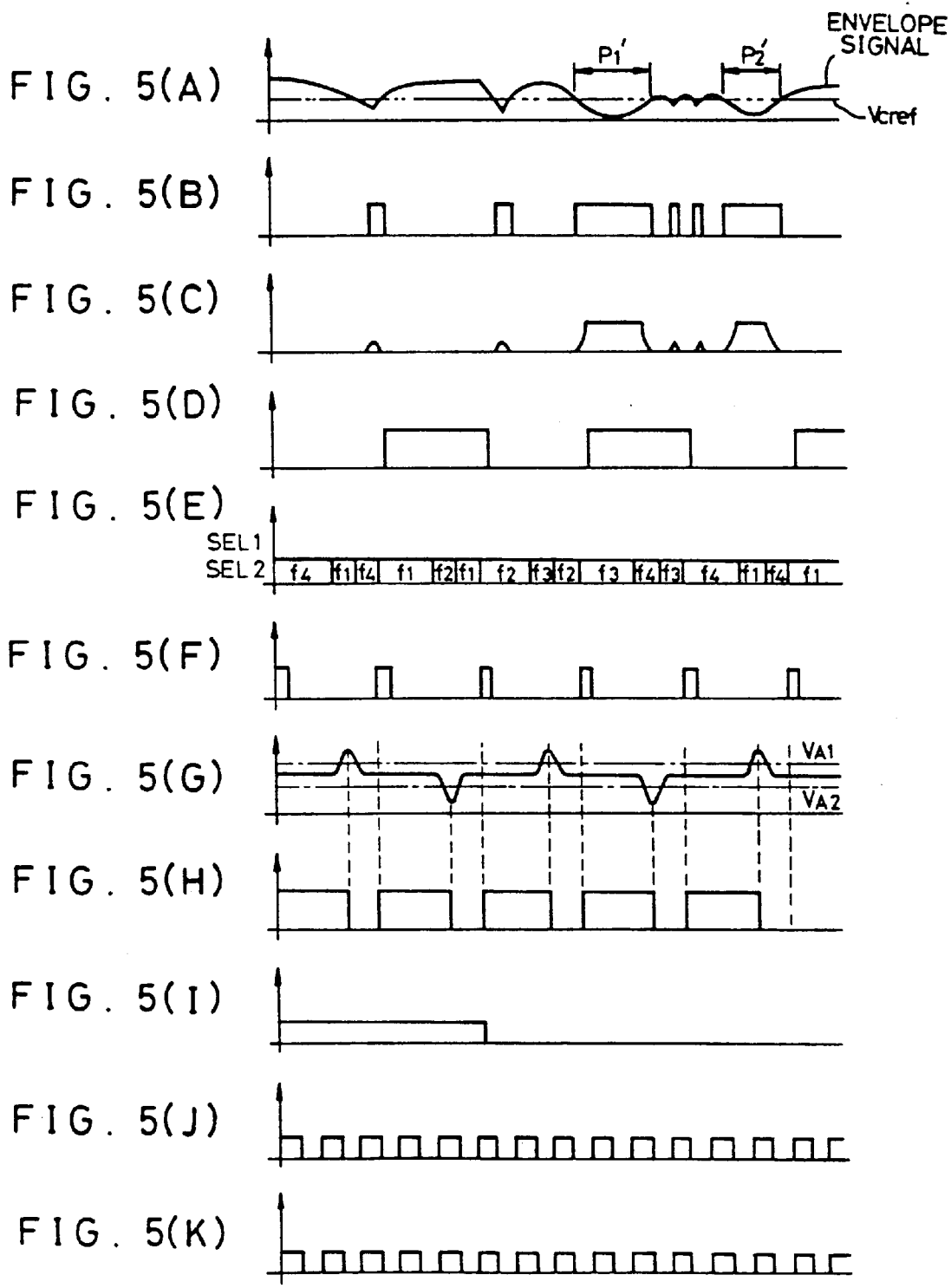
FIGS. 5(A)–5(K) are views showing signal waveforms appearing over the designated parts (A to K) in FIG. 4.

As an example, if a pilot signal $f_1$ is selected as the reference pilot signal, the ATF detector 14 provides an ATF signal like a waveform (G) in FIG. 5, which the level of the AFT signal ($V_{ATF}$) is represented as the following formula:

$$V_{ATF} = K_{ATF}(V_{f4-f1} - V_{f2-f1}) + V_{ref}$$

where $V_{f4-f1}$ is the level of a subtracted pilot signal $f_4-f_1$, $V_{f2-f1}$ is the level of a subtracted pilot signal $f_2-f_1$, $K_{ATF}$ is an amplification gain, and $V_{ref}$ is a reference voltage which is adjusted to half the supply voltage.

The ATF signal, see the waveform (G) in FIG. 5, provided from the ATF detector 14 is converted into a digital value by an analog-to-digital converter 15. The digital-converted ATF signal then enters a band comparator 17. A leading or trailing edge of a head-changing signal, see a waveform (D) in FIG. 5, coming from a head-changing switch (H/SW) is detected as a waveform (F) in FIG. 5 by an edge detector 18. The detected leading or trailing edge is provided to the band comparator 17 as a reset signal and to a shift register 19 as a synchronous clock.

If the level of the ATF signal (the waveform (G) in FIG. 5) is higher than that of a reference $V_{A1}$ or lower than that of a reference $V_{A2}$, that is, deviates from a reference zone, the output of the band comparator 17 goes low, see a waveform (H) in FIG. 5, and remains in the lowered state until the reset signal is applied. When the reset signal is applied, the band comparator 17 outputs a high level signal. Accordingly, before the reset signal being applied, if the ATF signal exists in the reference zone, or between the references $V_{A1}$ and $V_{A2}$, the band comparator 17 outputs a high level signal as the waveform (H) in FIG. 5.

Figure 6:
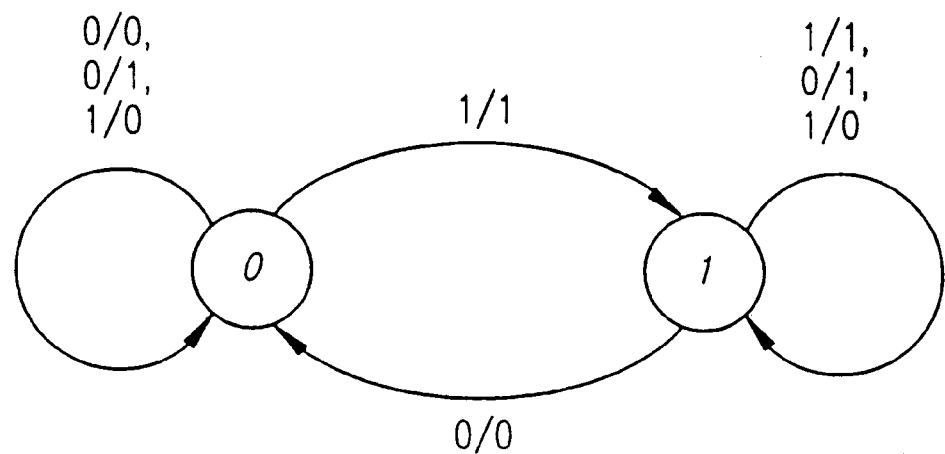
Figure 7:
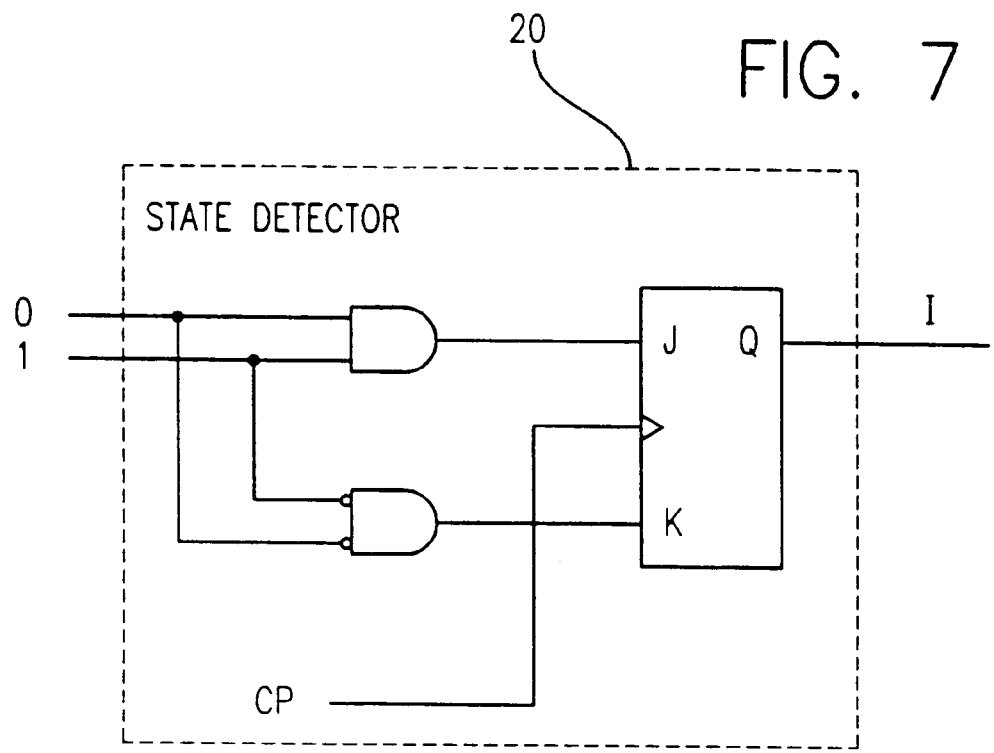

The output of the band comparator 17, see the waveform (H) in FIG. 5, is composed of the shift register 19 made up of flip-flops. The shift register 19 shifts the output train of the band comparator 17, using the reset signal (a waveform (L) in FIG. 5) from the edge detector 18 as a synchronous clock. The outputs of a bit 0 and a bit 1 of the shift register 19 is provided to the state detector 20. The state detector 20 makes its output a "0" when the logic of both the bit 0 and the bit 1 is (0,0), while makes its output a "1" when that logic is (1,1). It maintains the previous state when that logic is either (0,1) or (1,0). The state diagram for state detector 20 is shown in FIG. 6. An example of a sequential circuit implementing state detector 20 using a J-K flip-flop is shown in FIG. 7. The sequential circuit is constructed according to well-known techniques for implementing sequential circuits, such as taught in M. MORRIS MANO, COMPUTER SYSTEM ARCHITECTURE 26–35 (2d ed. 1982), which is incorporated herein by reference.

Three signals, the output of the state detector 20 (a waveform (I) in FIG. 5), the CLOG signal (the waveform (C) in FIG. 5), and the REC instruction are performed a logical product at the AND gate 21, and thereafter provided to the switch 8 as a control signal. The control signal does the same work as the counting section indicated in FIG. 1 according to the conventional art.

In operation of the AND gate 21, when the VCR is in a recording mode, because the REC instruction is 'low', the output comes to go 'low' regardless of the states of other inputs. Thereby, the real time counter 9 simply counts the number of the pulse of the CFG signal of which the waveform shaped after being generated from the frequency generator in the capstan motor 6.

When the VCR is in the rest mode, since the REC instruction is set 'high', the output of the AND gate 21 depends upon the states of other inputs.

Take periods $P_1'$ and $P_2'$, over the waveform (A) in FIG. 5 as an example. Even though the envelope signal exists on the periods $P_1'$ and $P_2'$, because its level is lower than that of the reference voltage Vcref, the CLOG signal goes 'high' during those periods as the waveform (C) in FIG. 5.

The relation between the input and output of the AND gate 21 during the periods $P_1'$ and $P_2'$ is indicated in the following table.

| INPUT | OUTPUT |
| --- | --- |
| Output of the State Detector | Low |
| Output of the CLOG Detector | High | High |
| REC Instruction | High |

Because the switch 8 is set to be turned on when the output of the AND gate 21 is 'low', the real time counter 9 performs a normal counting like waveform (K) in FIG. 5 without interruption.

As a result, despite the envelope signal appearing under the reference voltage Vcref, as the periods $P_1'$ and $P_2'$ over the waveform (A) in FIG. 5, the control apparatus of a real time counter for a VCR according to the present invention can accomplish the accurate counting without any abnormal interruption or suspension like the waveform (E) in FIG. 2, which is done by the ATF signal.

So far, the embodiment of hardware has been disclosed, but an embodiment of software would also meet the purpose of the present invention.

A typical PAL type 8-mm VCR which always has a guard band because the width of a head is narrower than that of a track, may be equipped with a control apparatus of a real time counter for a VCR.

What is claimed is:

1. A control apparatus of a real time counter for a video cassette recorder, comprising:

envelope detection means for detecting whether a signal exists or not, from a recorded signal reproduced by a head on a drum;

an automatic track following signal (ATF) detector for receiving said recorded signal reproduced by a head on a drum and producing an ATF signal in response thereto;

a band comparator for determining whether said ATF signal has exceeded predetermined upper and lower voltage limits and producing a band comparator output in response thereto;

counting means for counting a pulse signal from a capstan motor;

display means for displaying a resulting value counted by said counting means;

control means for providing a control signal for controlling the operation of said counting means according to the output signal of said envelope detection means and a recorded mode signal; and means for causing the counting means to continue counting in response to the band comparator output, despite a change in state in an output of said envelope detection means due to head tracking deviation.

2. A control apparatus of a real time counter for a video cassette recorder in accordance with claim 1 further comprising:

an analog-to-digital converter for converting said automatic track following signal into a digital signal, said band comparator being a digital band comparator responsive to said digital ATF signal;

an edge detector for detecting a leading or trailing edge of a head-changing signal;

a shift register for shifting the output of said comparator, using an edge-detected signal by said edge detector as a synchronous clock; and a state detector for detecting the state of an output of said shift register.

3. A control apparatus of a real time counter for a video cassette recorder in accordance with claim 2, wherein said state detector is characterized in that the output of said state detector is a "0" when the output pair of said shift register is (0,0), is a "1" when the output pair of said shift register is (1,1), and is a "1" when the output pair of said shift register is (1,1), and maintains the previous value when the output pair of said shift register is either (1,0) or (0,1).

4. A control apparatus of a real time counter for a video cassette recorder in accordance with claim 1, wherein said control means controls said counting means to stop counting of said pulse signal from said capstan motor in the event that there exists neither said video signal nor said ATF signal in a reproducing mode.

5. A control apparatus of a real time counter for a video cassette recorder, comprising:

an envelope detector for detecting whether a signal exists or not, from a signal recorded on a cassette tape;

an automatic track following (ATF) signal detector, for receiving said recorded signal and producing an ATF signal in response thereto;

a comparator for determining whether said ATF signal has exceeded predetermined limits at predetermined times with respect to a head changing switch signal, and for producing a counter control signal in response thereto; and a real time counter responsive to said counter control signal and an output of said envelope detector.

6. A control apparatus of a real time counter for a video cassette recorder in accordance with claim 5, wherein:

said comparator produces a first output if said ATF signal has not exceeded said predetermined limits between successive edges of said head changing switch signal, and a second and opposite output otherwise.

7. A method of controlling a real time counter in a video cassette recorder, the video cassette recorder including an ATF detector for producing an ATF signal in response to a signal recorded on a tape, the method comprising the steps of:

repetitively examining said ATF signal upon an edge of first polarity of a head changing switch signal to determine whether said ATF signal has deviated from a reference zone since an immediate prior and opposite edge of said head changing switch signal; and enabling said real time counter in the event that said ATF signal has not deviated from the reference zone.

* * * * *